(12) United States Patent
Link et al.

(10) Patent No.: US 11,924,056 B2
(45) Date of Patent: Mar. 5, 2024

(54) USER INTERFACE TOOLS FOR DEVICE-DRIVEN MANAGEMENT WORKFLOWS

(71) Applicant: VMware LLC, Palo Alto, CA (US)

(72) Inventors: Brian Link, Atlanta, GA (US); Rahul Parwani, Atlanta, GA (US)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 17/153,272

(22) Filed: Jan. 20, 2021

(65) Prior Publication Data
US 2022/0231921 A1 Jul. 21, 2022

(51) Int. Cl.
| | |
|---|---|
| H04L 41/22 | (2022.01) |
| G06F 8/34 | (2018.01) |
| G06Q 10/0631 | (2023.01) |
| H04L 9/40 | (2022.01) |
| H04L 41/00 | (2022.01) |
| H04L 41/082 | (2022.01) |

(52) U.S. Cl.
CPC .......... *H04L 41/22* (2013.01); *G06F 8/34* (2013.01); *G06Q 10/0631* (2013.01); *H04L 41/082* (2013.01); *H04L 41/20* (2013.01); *H04L 63/0263* (2013.01)

(58) Field of Classification Search
USPC ........................................................ 715/736
See application file for complete search history.

(56) References Cited

U.S. PATENT DOCUMENTS

| | | | |
|---|---|---|---|
| 7,392,162 B1* | 6/2008 | Srinivasan | G06F 8/10 703/22 |
| 9,904,585 B1 | 2/2018 | Islam et al. | |
| 10,122,577 B1 | 11/2018 | Rykowski et al. | |
| 10,324,783 B1 | 6/2019 | Saha et al. | |
| 10,416,996 B1 | 9/2019 | Samprathi et al. | |
| 10,469,304 B1 | 11/2019 | Kempe et al. | |
| 10,636,005 B2 | 4/2020 | Kamath et al. | |
| 10,673,712 B1 | 6/2020 | Gosar et al. | |
| 10,719,336 B1* | 7/2020 | Tsybulnyk | G06F 9/44552 |
| 11,082,302 B2 | 8/2021 | Mahajan et al. | |
| 2002/0138321 A1 | 9/2002 | Yuan et al. | |
| 2003/0009507 A1 | 1/2003 | Shum | |

(Continued)

OTHER PUBLICATIONS

Cloud Flow Designer Guide—Version 47.0, Winter '20, Salesforce, available at https://blog.bessereau.eu/assets/pdfs/salesforce_vpm_implementation_guide.pdf (updated Sep. 26, 2019).*

(Continued)

*Primary Examiner* — Matthew Ell
*Assistant Examiner* — Conrad R Pack
(74) *Attorney, Agent, or Firm* — King Intellectual Asset Management

(57) ABSTRACT

Examples of device-driven management are described. A management console can include a set of workflow objects to use in a workflow creation user interface. Workflow objects can be positioned in the workflow creation user interface area based on user manipulation. A device state criteria overlay can be painted on a connector workflow object to indicates that a branch of executable instructions corresponding to the connector workflow object is performed where a client device corresponds to the specified device state criteria.

20 Claims, 7 Drawing Sheets

(56) References Cited

U.S. PATENT DOCUMENTS

| | | | |
|---|---|---|---|
| 2005/0097536 A1 | 5/2005 | Bernstein et al. | |
| 2007/0203745 A1* | 8/2007 | Bartsch | G16H 30/20 |
| | | | 705/2 |
| 2008/0040181 A1 | 2/2008 | Freire et al. | |
| 2008/0097816 A1 | 4/2008 | Freire et al. | |
| 2008/0120574 A1* | 5/2008 | Heredia | G06Q 10/063 |
| | | | 715/835 |
| 2008/0270597 A1 | 10/2008 | Tenenti | |
| 2008/0271022 A1* | 10/2008 | Strassner | H04L 41/0873 |
| | | | 718/100 |
| 2009/0044185 A1 | 2/2009 | Krivopaltsev | |
| 2010/0010791 A1* | 1/2010 | Anerousis | G06Q 10/06 |
| | | | 703/6 |
| 2010/0146396 A1* | 6/2010 | Able | G06F 16/95 |
| | | | 715/735 |
| 2011/0161284 A1* | 6/2011 | Tewari | G06F 16/2365 |
| | | | 707/694 |
| 2012/0246122 A1* | 9/2012 | Short | G06F 16/20 |
| | | | 707/694 |
| 2012/0304007 A1 | 11/2012 | Hanks et al. | |
| 2013/0174047 A1 | 7/2013 | Sivakumar et al. | |
| 2014/0013315 A1 | 1/2014 | Genevski et al. | |
| 2014/0040840 A1* | 2/2014 | Hysong | G06F 30/00 |
| | | | 716/106 |
| 2014/0164944 A1 | 6/2014 | Sivakumar et al. | |
| 2014/0240745 A1 | 8/2014 | Boldt et al. | |
| 2015/0149912 A1* | 5/2015 | Moore | H04L 41/22 |
| | | | 715/736 |
| 2015/0355935 A1 | 12/2015 | Ozaki et al. | |
| 2016/0042541 A1* | 2/2016 | Nixon | G06T 11/206 |
| | | | 345/440 |
| 2016/0179449 A1 | 6/2016 | Cho | |
| 2016/0234073 A1 | 8/2016 | Maes | |
| 2017/0161347 A1* | 6/2017 | Raza | G06F 16/26 |
| 2017/0288959 A1 | 10/2017 | Kelley et al. | |
| 2017/0346683 A1 | 11/2017 | Li | |
| 2017/0364843 A1 | 12/2017 | Haligowski et al. | |
| 2017/0373932 A1 | 12/2017 | Subramanian et al. | |
| 2018/0048521 A1* | 2/2018 | Nair | G06F 8/60 |
| 2018/0183762 A1 | 6/2018 | Fetvadjiev et al. | |
| 2019/0101882 A1* | 4/2019 | Strinden | G05B 19/41865 |
| 2019/0199597 A1* | 6/2019 | Valisammagari | H04L 41/40 |
| 2019/0312910 A1 | 10/2019 | Convertino et al. | |
| 2019/0340049 A1 | 11/2019 | Saha et al. | |
| 2019/0347168 A1 | 11/2019 | Giannetti | |
| 2020/0074115 A1 | 3/2020 | Di Pietro et al. | |
| 2020/0111041 A1 | 4/2020 | Levine et al. | |
| 2020/0274773 A1 | 8/2020 | Mortsolf et al. | |
| 2020/0301679 A1* | 9/2020 | Eteminan | G06F 11/3688 |
| 2020/0344131 A1 | 10/2020 | Barton et al. | |
| 2020/0379744 A1 | 12/2020 | Bhupati et al. | |
| 2021/0092015 A1 | 3/2021 | Gardner et al. | |
| 2021/0124610 A1 | 4/2021 | Gardner et al. | |
| 2021/0149784 A1 | 5/2021 | Soorya et al. | |
| 2021/0373942 A1 | 12/2021 | Lv et al. | |
| 2022/0164181 A1 | 5/2022 | Reddy et al. | |
| 2022/0229742 A1 | 7/2022 | Jain et al. | |
| 2022/0231921 A1 | 7/2022 | Link et al. | |
| 2022/0239550 A1 | 7/2022 | Parwani et al. | |
| 2022/0239735 A1 | 7/2022 | Deriso et al. | |

OTHER PUBLICATIONS

Deelman, Ewa, et al. "The evolution of the pegasus workflow management software." Computing in Science & Engineering 21.4 (2019): 22-36.

Pla, Albert, et al. "Petri net-based process monitoring: a workflow management system for process modelling and monitoring." Journal of Intelligent Manufacturing 25.3 (2014): 539-554.

Schulz, Karsten A., and Maria E. Orlowska. "Facilitating cross-organisational workflows with a workflow view approach." Data & Knowledge Engineering 51.1 (2004): 109-147.

Van der Aalst, Wil MP, Mathias Weske, and Guido Wirtz. "Advanced topics in workflow management: Issues, requirements, and solutions." Journal of Integrated Design and Process Science 7.3 (2003): 49-77.

Wagner, Thomas, and Daniel Moldt. "Workflow management principles for interactions between petri net-based agents." International Conference on Applications and Theory of Petri Nets and Concurrency. Springer, Cham, 2015.

Perez-Capparros, David, et al. "An architecture for creating and managing virtual networks." 2013 IEEE 24th Annual International Symposium on Personal, Indoor, and Mobile Radio Communications (PIMRC). IEEE (Year: 2013).

* cited by examiner

USER INTERFACE TOOLS FOR DEVICE-DRIVEN MANAGEMENT WORKFLOWS

BACKGROUND

Various challenges can arise in the management of enterprise resources using a management service. Access to the capabilities of a device can be managed through the administration of compliance rules defined and enforced by the management service. The proliferation of personal tablet and smartphone devices, for example, has resulted in several companies and organizations allowing employees to use their own devices for enterprise purposes. The use of these personal devices can be associated with productivity gains and cost savings. The concept "bring your own device" (BYOD) for access to enterprise computing systems may have met initial resistance due to security concerns, but more and more companies are now looking to incorporate BYOD policies. This causes enterprises to manage a growing number of different desktop, tablet, and mobile devices, along with various platforms and operating systems available for adoption by users. Many enterprises include employees that work in various locations including a traditional workplace, temporary field workplaces, as well as from home. At the same time, complexity of processes utilized for protecting enterprise resources has increased, requiring higher bandwidth for the constant communication of managed devices with the management service. Personal devices can frequently lose network connectivity, causing security issues, management failures, and delays. There is a need for a more efficient and effective device management paradigm.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The present disclosure relates to generation of client-device-driven management workflows. Many enterprises allow employees to work in various locations including traditional workplaces, temporary or field workplaces, as well as from home. At the same time, complexity of processes utilized for protecting enterprise resources has increased, requiring higher bandwidth for the constant communication of managed devices with a management service. Personal devices can frequently lose network connectivity, causing security issues, management failures, and delays. However, the present disclosure describes mechanisms that solve these issues using tools that enable efficient generation and deployment of client-device-driven management workflows.

Figure 1:
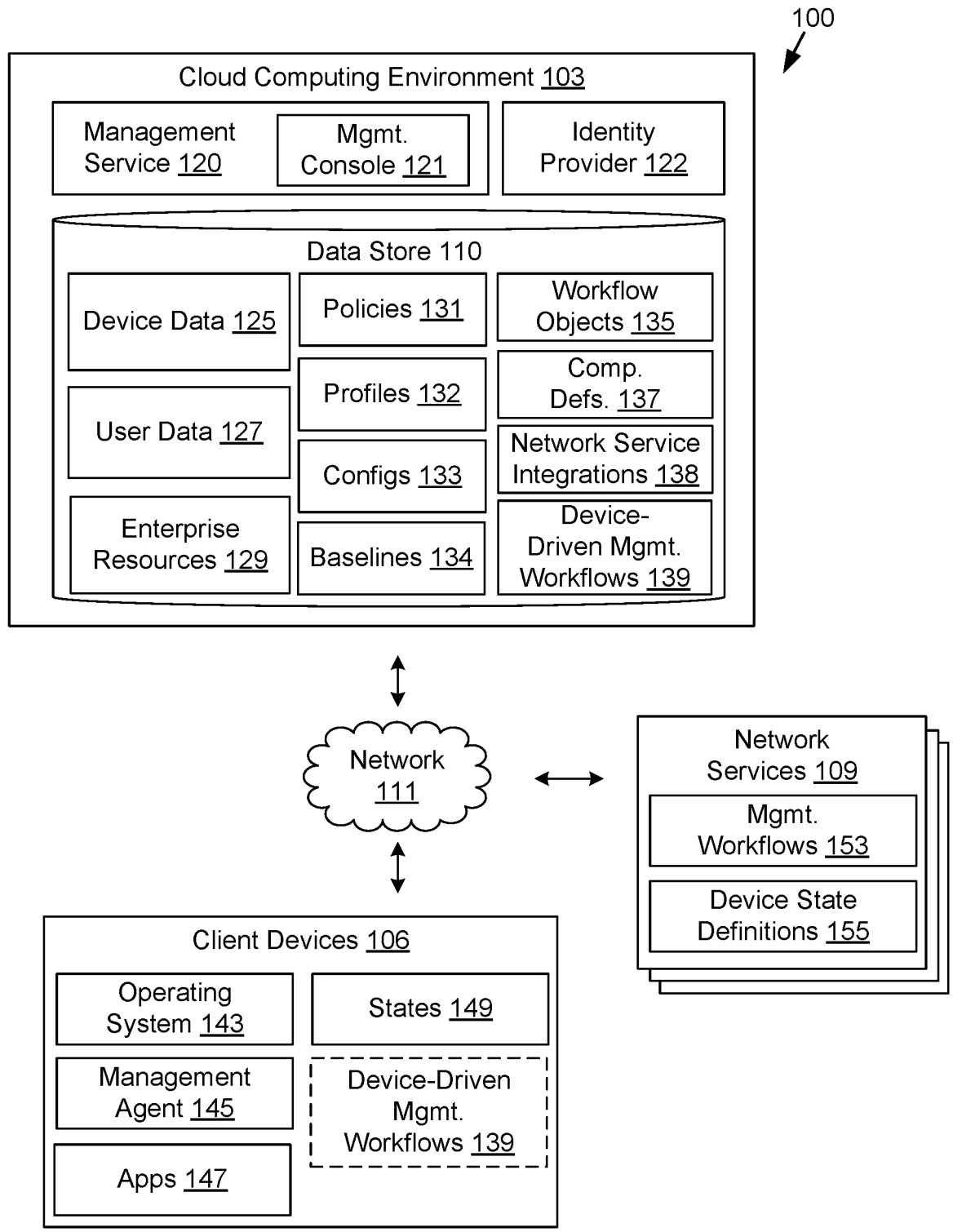
FIG. 1 illustrates an example networked environment that provides tools for device-driven management, according to various examples described herein.

FIG. 1 illustrates an example networked environment 100 for generation of client-device-driven management workflows according to various examples described herein. The networked environment 100 includes a computing environment 103, several client devices 106, and a network service 109 in communication using a network 111.

The computing environment 103 can be embodied as one or more computers, computing devices, or computing systems. In certain embodiments, the computing environment 103 can include one or more computing devices arranged, for example, in one or more server or computer banks. The computing device or devices can be located at a single installation site or distributed among different geographical locations. The computing environment 103 can include a plurality of computing devices that together embody a hosted computing resource, a grid computing resource, or other distributed computing arrangement. In some cases, the computing environment 103 can be embodied as an elastic computing resource where an allotted capacity of processing, network, storage, or other computing-related resources varies over time. As further described below, the computing environment 103 can also be embodied, in part, as certain functional or logical (e.g., computer-readable instruction) elements or modules as described herein.

The computing environment 103 can operate as an environment for mobile device management or a Unified Endpoint Management (UEM) platform that can manage the client devices 106. In that context, the computing environment 103 includes a data store 110. The computing environment 103 can also execute a management service 120. The management service 120 can generate a management console 121 that includes a user interface through which an administrator or other user can manage client devices 106 that are enrolled with the management service 120. The administrator can access the management console 121 using a client device 106. An identity provider 122 can be hosted using the computing environment 103 or can be used as a network service 109 in conjunction with the management service 120.

The data store 110 includes areas in memory for the storage of device data 125, user data 127, enterprise resources 129, policies 131, profiles 132, configurations 133, baselines 134, and other compliance rules. The data store 110 can also include workflow objects 135, comprehensiveness definitions 137, and device-driven management workflows 139, among other types of data. The management service 120 can operate as a UEM platform that can manage client devices 106 that are enrolled as managed devices with the management service 120. The management service 120 and the management console 121 can be accessible over a public wide area network (WAN) such as the Internet.

Device data 125 can represent information about client devices 106 that are enrolled as managed devices with the management service 120. The device data 125 can include a device identifier, certificates associated with the client device 106, a user identifier identifying the user account with which the device is linked, authentication tokens provided by the identity provider 122 to the client device 106, configuration profiles and compliance policies 131 assigned to the client device 106, and other information regarding management of the client device 106 as an enrolled device. The device data 125 can also include a last-known compliance status associated with a managed client device 106. The compliance status can identify which compliance rules the client device 106 or a user account linked to the client device 106 has violated. For example, the client device 106 may have been taken outside of a specified geofence defined for the client device 106. The device data 125 can also indicate a device type and a platform of the client device 106. The device type can include desktop-type device, mobile-type device, tablet-type device, and the like. Device type can also refer to a device model or serial number. The platform of the client device 106 can be an indication of an operating system 143 such as Windows® 10, macOS®, iOS®, Android®, as well as other versions of the operating system 143.

User data 127 represents information about users who have user accounts with the management service 120 or an enterprise that uses the management service 120. These users can also have one or more client devices 106 that are enrolled as managed devices with the management service 120. User data 127 can include authentication data, and information about network services with which the user is assigned an account. The user data 127 can include a user account associates a user identifier and one or more device identifiers for client devices 106.

The management service 120 can enroll several client devices 106 for mobile device management services. To begin enrollment, the management service 120 can identify and authenticate one of the client devices 106 and store data related to the client device 106 in the device data 125 for later reference. In some cases, the management service 120 (or a management agent 145, an application 147, or another component executing on the client device 106) can also be registered as a device administrator (at least in part) of the client device 106, permitting the management service 120 to configure and manage certain operating aspects of the client device 106.

Once a client device 106 is enrolled for device management by the management service 120, the management service 120 can provide device-driven management workflows 139 for implementation on the client device 106. The device-driven management workflows 139 can enforce policies 131, profiles 132, configurations 133, security baselines 134, and other compliance rules. The device-driven management workflows 139 can also deploy enterprise resources 129 such as applications 147, data resources, and access to network services 109 that are federated with the identity provider 122.

The management service 120 can also maintain individual and group command queues for the client device 106. A client device 106 can periodically check in and retrieve commands from the command queue. The management service 120 can also transmit a check-in notification to the client device 106 that includes instructions to check in. The check-in notification can be transmitted using a push notification service or another notification service, and the client device 106 can check in based on the notification. The management service 120 can provide the device-driven management workflows 139 by placing, in a command queue for the client device 106, a command to execute the device-driven management workflow 139. The client device 106 can check in, retrieve the command, and download the device-driven management workflow 139 from a location specified by the command. Once received, the device-driven management workflow 139 can be implemented by the client device 106 without checking in with the command queue, including in scenarios where the client device 106 lacks a connection with the network 111 or otherwise lacks access to the command queue.

The management service 120 can also include, in the command queue, a command to provide states 149, completion statuses, and other status data associated with execution of the device-driven management workflow 139. The client device 106 can maintain a log of states 149, completion statuses, and other workflow status data regarding execution of the device-driven management workflow 139. The client device 106 can check in, retrieve the command to provide status data, and transmit the states 149, completion statuses, and other specified information from the log. In other examples, the management agent 145 can transmit this data to the management service 120 periodically, on a schedule, and at specified points in the device-driven management workflows 139. The management service 120 can identify success or failure of a portion of the device-driven management workflow 139 based on the states 149 and other information received.

Workflow objects 135 can include a set of graphical tools that can be used in the management console 121 to form and edit device-driven management workflows 139. Each workflow object 135 can include instructions formatted using a particular syntax. Since the workflow objects 135 can be used to form the device-driven management workflows 139, each device-driven management workflows 139 can also use the syntax of the workflow objects 135. Installation type workflow objects 135 can include instructions that specifies a parameter that indicates to install payloads, policies 131, profiles 132, configurations 133, baselines 134, and other enterprise resources 129. Evaluation type workflow objects 135 can include instructions that specifies a parameter that indicates to evaluate device states 149, policies 131, profiles 132, configurations 133, baselines 134, and device state definitions 155 such as evaluation of device-specific risk levels for a client device 106 based on its states 149. Entry point type workflow objects 135 can workflow objects 135 can specify a parameter that indicates a set of client devices 106, for example, according to user group, device type, platform, other device data 125, and other user data 127.

The workflow objects 135 can also include connector workflow objects 135 between other workflow objects 135. Connector workflow objects 135 can specify conditions and states 149 under which a branch corresponding to that connector is to be implemented. Connector workflow objects 135 can extend from a conditional workflow object 135. Conditional workflow objects 135 can include if, while, for, AND, OR, NAND, NOR, and other conditions. The states 149 for respective branch connectors from an if-conditional workflow object 135 can be mutually exclusive from states 149 for other branch connectors. Alternatively, the states 149 for branch connectors from an if-conditional workflow object 135 can be evaluated in an order specified by the if-conditional workflow object 135.

Comprehensiveness definitions 137 can identify a set of device states 149 or device conditions that a device-driven management workflow 139 can include in order to be considered comprehensive. In some cases, a comprehensiveness definition 137 can be generated for a particular enterprise based on the known device data 125 and user data 127 for the enterprise. In other cases, a comprehensiveness definition 137 can be generated for a particular user group or another logical grouping of client devices 106 using a filtered subset of the device data 125 and user data 127 for that logical grouping of client devices 106.

States 149 can include a platform or operating system 143 of the client device 106; a sensor value or range of sensor values detected by a sensor of the client device 106; whether an application 147 is installed on the client device 106; whether a script has been executed on the client device 106, whether a file is stored on the client device 106; a total, used, or available amount of storage, memory, compute, or network bandwidth for the client device 106; a network address or IP address of the client device 106; a geolocation or physical location of the client device 106; and a model or type of the client device 106.

The management service 120 can analyze the device data 125 and the user data 127 for a particular logical grouping of client devices 106 and generate a comprehensiveness definition 137 that includes a superset of conditions including platforms, states 149, user groups, networks, geolocations, and applications 147 for the logical grouping of client devices 106. The management service 120 can identify a logical grouping of client devices 106 relevant to a device-driven management workflow 139.

Comprehensiveness definition 137 can be static or dynamic. For example, a user can access the management console 121 and begin designing a device-driven management workflow 139. The management service 120 can analyze the workflow objects 135 of the device driven workflow 139 and determine that the device-driven management workflow 139 is limited to a particular user group, a particular operating system, or both. The management service 120 can identify a logical grouping of client devices 106 based on the current limitations of the device-driven management workflow 139. The management service 120 can generate a dynamic workflow-specific comprehensiveness definition 137 that includes a superset of conditions including platforms, states 149, user groups, networks, geolocations, and applications 147 limited to the workflow-specific logical grouping of client devices 106. The management console 121 can provide recommendations for the device-driven management workflow 139 based on the workflow-specific comprehensiveness definition 137.

In another example, the user can select a static comprehensiveness definition 137 that includes conditions including platforms, states 149, user groups, networks, geolocations, and applications 147 for comprehensive coverage of client device 106. Even if the device-driven workflow 139 is currently limited to devices that do not correspond to the static comprehensiveness definition 137, the management console 121 can provide recommendations for the device-driven management workflow 139 based on the broader set of conditions of the static comprehensiveness definition 137. Recommendations can identify locations such as workflow objects 135 and branching locations where a condition can be added to the device-driven management workflow 139. The comprehensiveness definitions 137 can be used by the management console 121 to provide recommendations for device conditions, states 149, applications 147, and enterprise resources 129 to include in a particular device-driven management workflow 139.

Unlike traditional management workflows that are directed by the management service 120, the device-driven management workflows 139 enable an end user's client device 106 to direct deployment operations to install policies 131, profiles 132, configurations 133, security baselines 134, and other compliance rules, as well as applications 147, certificates, and other enterprise resources 129. To this end, device-driven management workflows 139 can include a branching sequence of instructions that branches based on states 149 that are evaluated on the end user's client device 106. States 149 can be evaluated by a management agent 145 based on instructions in the device-driven management workflows 139 once delivered. As a result, the path that is ultimately executed for a single device-driven management workflow 139 can be different for different client devices 106 that include different states 149.

States 149 can include conditions on the client device 106 such as platform of the client device 106, a type of the client device 106, a geolocation of the client device 106, a public or private network to which the client device 106 is communicatively connected, a user group associated with the client device 106, applications 147 that are installed on the client device 106, settings of the client device 106, and other device conditions.

The management service 120 can also provide a management console 121 as an engine and console interface for device management of the client devices 106. An information technology administrator or user, for example, can view, administer, and update client-device driven management workflows 139 using the management console 121. The client-device driven management workflows 139 can be deployed or transmitted to a set of the client devices 106 to install and enforce policies 131, profiles 132, configurations 133, security baselines 134, and other compliance rules. The client-device driven management workflows 139 can also install applications 147, and other components that enable access to network services 109 and enterprise resources 129. The compliance rules can be collectively administered for several of the client devices 106 by organizing the client devices 106 into several different groups or categories of devices according to organizational, platform, and other factors.

The management console 121 can include a workflow creation user interface area. The workflow creation user interface area can include a drag-and-drop canvas user interface area that shows the workflow objects 135 of a device-driven management workflow 139 in a workflow view; a programming language user interface area that shows the workflow objects 135 of a device-driven management workflow 139 in text instructions or code form; or a list or tree view that shows the workflow objects 135 of a device-driven management workflow 139.

The identity provider 122 can provide single sign-on or identity management capabilities for access to enterprise resources 129 through the management service 120 as well as network services 109. The identity provider 122 can allow users to authenticate his or her identity to obtain an authentication token that can be provided to a network service 109. The identity provider 122 can utilize OAuth, security assertion mark-up language (SAML), or other single sign-on methodologies. The identity provider 122 and management service 120 can communicate so that the management service 120 can revoke or authorize access to various services for users in the enterprise based on status of a client device 106 assigned to the user. The identity provider 122 can also rely on user data 127 in the data store 110. In some examples, the identity provider 122 can rely upon a separate source of user data in a separate data store.

The network service 109 can be embodied as one or more computers, computing devices, or computing systems. Like the computing environment 103, the network service 109 can include one or more computing devices arranged, for example, in one or more server or computer banks. The computing device or devices can be located at a single installation site or distributed among different geographical locations. The network service 109 can include a plurality of computing devices that together embody a hosted computing resource, a grid computing resource, or other distributed computing arrangement. The network service 109 can also be embodied, in part, as certain functional or logical (e.g., computer-readable instruction) elements or modules as described herein. The network service 109 can be provided by an enterprise to its users and can include first- and third-party network services 109 with respect to the management service 120. For example, a network service 109 can include an optional service from a provider of the management service 120 or can be a third-party network service 109. The management workflows 153 and the device state definitions 155 from a third-party network service 109 can be referred to as third-party management workflows 153 and third-party device state definitions 155. The network service 109 can federate its authentication for users of the enterprise to the identity provider 122. The network service 109 can be accessible over the Internet or another public WAN.

The client devices 106 are representative of one or more client devices. Each client device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client devices 106 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 106.

An example client device 106 can be enrolled by the management service 120 for device management. A management agent 145 can be installed on a client device 106 to locally manage the device using device-driven management workflows 139 that are provided by the management service 120. The management agent 145 can be installed with elevated privileges or be effectuated through operating system APIs to manage the client device 106 on behalf of the management service 120. The management agent 145 can have the authority to manage data on the client device 106, install, remove, or disable certain applications, or install configuration profiles, such as VPN certificates, Wi-Fi profiles, email profiles, etc.

The management agent 145 can also have the authority to enable or disable certain hardware features of the client device 106 that are specified for a particular branch of a device-driven management workflow 139. The management agent 145 can also place the device into different hardware modes, such as airplane mode, silent mode, do-not-disturb mode, or other modes supported by the client device 106.

The management agent 145 can perform device-driven management workflows 139 to alter operation of the client device 106 in response to changes in states 149 that are detected on the client device 106. The management agent 145, in one instance, can periodically poll the operating system 143, a data store, or other software and hardware components of the client device 106 to identify states 149 that are indicated in a device-driven management workflow 139.

The device-driven management workflows 139 can include appropriate commands in response to certain states 149. Commands can include generating a notification on the client device 106, sending a notification to an administrator, sending a notification and other compliance data to the management service 120, changing a non-compliant state 149 to a compliant state 149, deleting applications 147 and other enterprise resources, ending a SSO session with the identity provider, removing access to enterprise resources, and other management actions on the client device 106. In one example, the management agent 145 can detect that the client device 106 is out of compliance with respect to a compliance rule indicated in device-driven management workflows 139 and might instruct the management agent 145 to restrict a hardware feature of the client device 106, delete data from the client device 106, or disable certain applications on the client device 106. The management agent 145 can also take other variations of management actions on the client device 106 as directed by the device-driven management workflows 139.

As part of the enrollment process, the management service 120 and/or management agent 145 can be registered as a device administrator of the client device 106, permitting the management service 120 and/or management agent 145 to manage certain operating aspects of the client device 106. In either case, the management service 120 can remotely configure the client device 106 by interacting with the management agent 145. The device-driven management workflows 139 can also indicate various applications 147 and software components to install on the client device 106. Such software components can include, for example, applications, resources, libraries, drivers, device configurations, or other related components. The device-driven management workflows 139 can also indicate network locations where the software components can be downloaded for installation. The device-driven management workflows 139 can also indicate to download and install compliance rules and instruct the management agent 145 and the operating system 143 of the client device 106 to enforce the compliance rules.

The network 111 can include the Internet, intranets, extranets, wide area networks (WANs), local area networks (LANs), wired networks, wireless networks, cable networks, satellite networks, other suitable networks, or any combinations thereof. As one example, the computing environment 103 and the client devices 106 can be respectively coupled to one or more public or private LANs or WANs and, in turn, to the Internet for communication of data among each other. Although not shown in FIG. 1, the network 111 can also include communicative connections to any number and type of network hosts or devices, such as website servers, file servers, cloud computing resources, databases, data stores, or any other network or computing architectures.

In the networked environment 100, the computing environment 103, the network service 109, and the client devices 106 can communicate data among each other over the network 111 using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The management workflows 153 can include enterprise management workflows 153 for an enterprise employing the management service 120. The device state definitions 155 can include device state definitions 155 and enterprise device state definitions 155. The network services 109 can include previous or legacy management services, community network sites where management workflows 153 and device state definitions 155 can be publicly posted and accessed, private servers to which an enterprise has access, and other services.

The management service 120 can include network service integrations 138 that enable the management service 120 to identify and retrieve first- and third-party resources including the management workflows 153 and device state definitions 155. The management service 120 can display these resources in the management console 121. The management service 120 can also allow management workflows 153 and device state definitions 155 to be imported and translated into device-driven management workflows 139. A device state definition 155 can be reformatted using a particular syntax to form a new or modified workflow object 135, or a device-driven management workflow 139 capable of assessing the device state definitions 155 on a client device 106. A management workflow 153 can be retrieved and reformatted into a device-driven management workflow 139 that is expressed using a set of workflow objects 135.

Figure 2A:
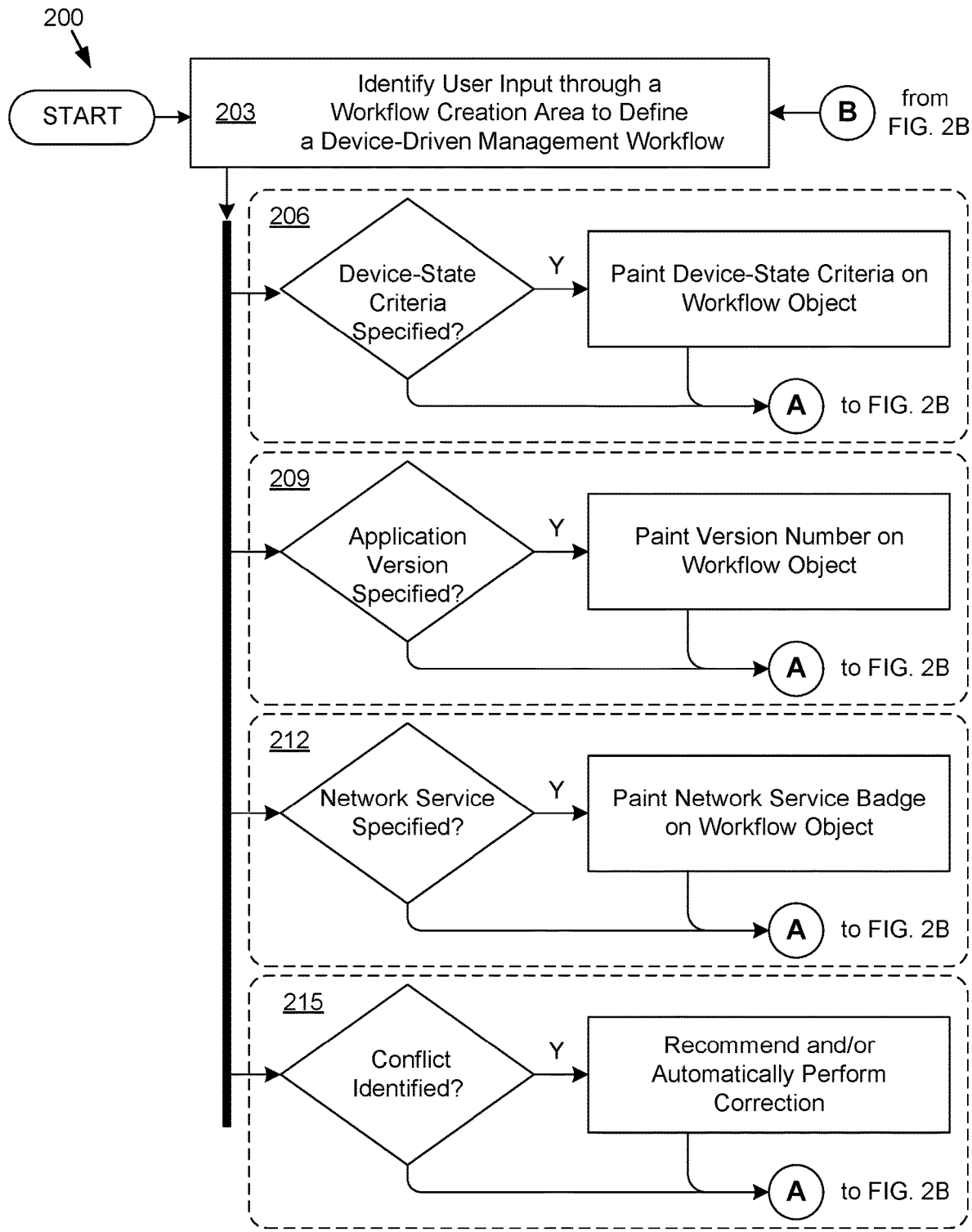
FIG. 2A illustrates a flowchart performed by components of the networked environment for device-driven management, according to various examples described herein.

FIG. 2A shows a flowchart performed by components of the networked environment 100. Specifically, the flowchart describes how the management console 121 provides user interface tools to efficiently and intuitively design device-driven management workflows 139. Actions performed by the management console 121 can also be considered functionality performed by the management service 120, which provides the management console 121. Some functionalities discussed can also be performed by other components of the networked environment 100. Segmentation and ordering indicated in the flowchart 200 is for example purposes only. The functionality described for a particular step can be performed in any order relative to the other steps described.

At step 203, the management console 121 can identify user input through a workflow creation user interface area to define a device-driven management workflow 139. The user input can include manipulation of a user input peripheral device such as a mouse, keyboard, trackpad, touchscreen, or touch device. The management console 121 can include a workflow creation user interface area and a tool panel that includes a set of workflow objects 135. The workflow creation user interface area can include a drag-and-drop canvas user interface area that shows the workflow objects 135 of a device-driven management workflow 139 in a workflow view. The workflow objects 135 can be selected, placed, moved, and connected in the drag-and-drop canvas to form device-driven management workflows 139. The workflow objects 135 can be selected, placed, moved, and connected in the drag-and-drop canvas to form device-driven management workflows 139. Other views and manipulation types can also be used as described.

Device-driven management workflows 139 can include a branching sequence of instructions that branches based on states 149 that are evaluated on the end user's client device 106. A path that is ultimately performed and executed for a single device-driven management workflow 139 can be different for different client devices 106 based on the particular states 149 of the devices.

The workflow objects 135 can include instructions that can be performed by the management agent 145, as well as a graphical representation that can be manipulated in the management console 121 to form device-driven management workflows 139. Each workflow object 135 can be represented by an icon or another graphical representation. Workflow objects 135 can include instructions that install payloads, policies 131, profiles 132, configurations 133, baselines 134, and other enterprise resources 129. Workflow objects 135 can include instructions that evaluate device states 149, policies 131, profiles 132, configurations 133, baselines 134, and device state definitions 155 such as evaluation of device-specific risk levels for a client device 106 based on its states 149.

The workflow objects 135 can also include entry points. Entry points can be the starting point for a device-driven management workflow 139. Different types of workflows can have different types of entry points. For example, a provisioning device-driven management workflow 139 can have an entry point that specifies a group of client devices 106 according to user group, device type, platform, other device data 125, and other user data 127. A smart application device-driven management workflow 139 can have an entry point that specifies an application workflow object 135 that triggers its execution. A state evaluation device-driven management workflow 139 can have an entry point that specifies to periodically poll for a state 149. A state evaluation device-driven management workflow 139 can be deployed as an enforcement mechanism that performs a branching set of instructions based on adherence to or violation of policies 131, profiles 132, baselines 134, required or prohibited applications 147, and other states 149. The process can then move to step A, which connects to FIG. 2B.

At step 206, the management console 121 can determine whether device state criteria is specified for a workflow object 135 in the workflow creation user interface area. For example, a user can draw a number of connector workflow objects 135 that extend to or from an evaluation workflow object 135, such as an if-evaluation workflow object 135. Each of the connector workflow objects 135 can specify a state 149. When the management agent 145 performs the device-driven management workflow 139 on a client device 106, a branch of instructions corresponding to the connector workflow object 135 if the state 149 is detected on the client device 106.

If a state 149 is specified for a connector workflow object 135, then the management console 121 can paint the connector workflow object 135 to show a device state criteria overlay that describes or identifies the state 149. The device state criteria overlay can include a user interface element overlaid on a line-type connector workflow object 135 that connects two other workflow objects 135. This can enable the user that is designing the device-driven management workflow 139 to quickly identify the conditions or states 149 associated with each branch of the device-driven management workflow 139. The process can then move to step A, which connects to FIG. 2B.

At step 209, the management console 121 can determine whether an application version such as a legacy application version is specified for a workflow object 135 in the workflow creation user interface area. A legacy application version can refer to any version of the application that is not the most recent version of the application for a particular operating system 143 or platform. While this example discusses application versions, the legacy version can apply to any enterprise resource 129 such as a legacy script version, a legacy configuration version, a legacy dataset version, and other legacy resource versions specified for resource installation workflow objects 135.

A connector workflow object 135 can extend to an application installation workflow object 135. The application installation workflow object 135 can include instructions to install an application 147 on a client device 106. If the user does not specify a particular version of the application 147, then application installation workflow object 135 can include instructions to download and install a default or most recent version of the application 147. The graphical representation of the application installation workflow object 135 can include an unlabeled icon or an icon labeled using a name of the application 147.

Some states 149 can cause the default version of the application 147 to be unstable. The management console 121 can identify that a connector workflow object 135 specifies a particular state 149, and can recommend or automatically update the application installation workflow object 135 to download and install a particular version of the application 147. Alternatively, a user can specify the application version. In either case, if the version of the application 147 specified for an application installation workflow object 135 is not the default or most recent version, then the graphical representation of the application installation workflow object 135 can include a label or badge overlay that includes a version number. This can enable the user that is designing the device-driven management workflow 139 to quickly identify that a special version, legacy version, or otherwise non-default version of the application 147 is specified. The process can then move to step A, which connects to FIG. 2B.

At step 212, the management console 121 can determine whether a network service 109 is specified for a workflow object 135 in the workflow creation user interface area. Generally, a workflow object 135 can specify a back end network service 109 that is utilized to perform the functionality of the workflow object 135. The workflow object 135 can specify a function of the network service 109 that the client device 106 invokes in order to perform the functionality of the workflow object 135.

An application access workflow object 135 can specify a network service 109 that provides network access to an application 147. An evaluation workflow object 135 can specify that an evaluated condition or state 149 is transmitted to a network service 109 for evaluation. Another evaluation workflow object 135 can specify that a condition or state 149 is received from a network service 109. A message transmission or another command workflow object 135 can specify a network service 109 that is used to transmit the message. If a network service 109 is specified for a workflow object 135, the management console 121 can paint a network service badge that includes an icon, logo, or name of the network service 109. The network service badge can be overlaid on the workflow object 135 to enable the user that is designing the device-driven management workflow 139 to quickly identify that a network service 109 is utilized. The process can then move to step A, which connects to FIG. 2B.

At step 215, the management console 121 can determine whether a conflicting workflow object 135 is identified in the workflow creation user interface area. For example, a workflow object 135 can specify installation of a policy 131, a profile 132, a configuration 133, a baseline 134, an application 147, a script, or other enterprise resources 129. The management console 121 can identify, for a particular workflow object 135, all upstream or parent workflow objects 135 in the device-driven management workflow 139. The management console 121 can identify all prerequisite conditions and states 149 specified by the upstream workflow objects 135. The management console 121 can determine whether the particular workflow object 135 conflicts with any of the prerequisite states 149, applications 147, operating systems 143, or other prerequisite conditions.

If a conflicting workflow object 135 is identified, then the management console 121 can identify a non-conflicting workflow object 135 of the same type as the conflicting workflow object 135. In other words, the non-conflicting workflow object 135 can perform the same action or a similar action using instructions and enterprise resources 129 that are compatible with prerequisite states 149 for that point in the device-driven management workflow 139.

For example, a conflicting application installation workflow object 135 can include instructions to install a conflicting application 147 that is incompatible with an operating system 143 specified by a parent workflow object 135. The management console 121 can identify a non-conflicting application installation workflow object 135 that installs a non-conflicting application 147 that is compatible with the operating system 143. The management console 121 can provide a recommendation to replace the conflicting workflow object 135 with the non-conflicting or compatible workflow object 135. The management console 121 can also automatically replace the conflicting workflow object 135 with the non-conflicting workflow object 135. The process can then move to step A, which connects to FIG. 2B.

Figure 2B:
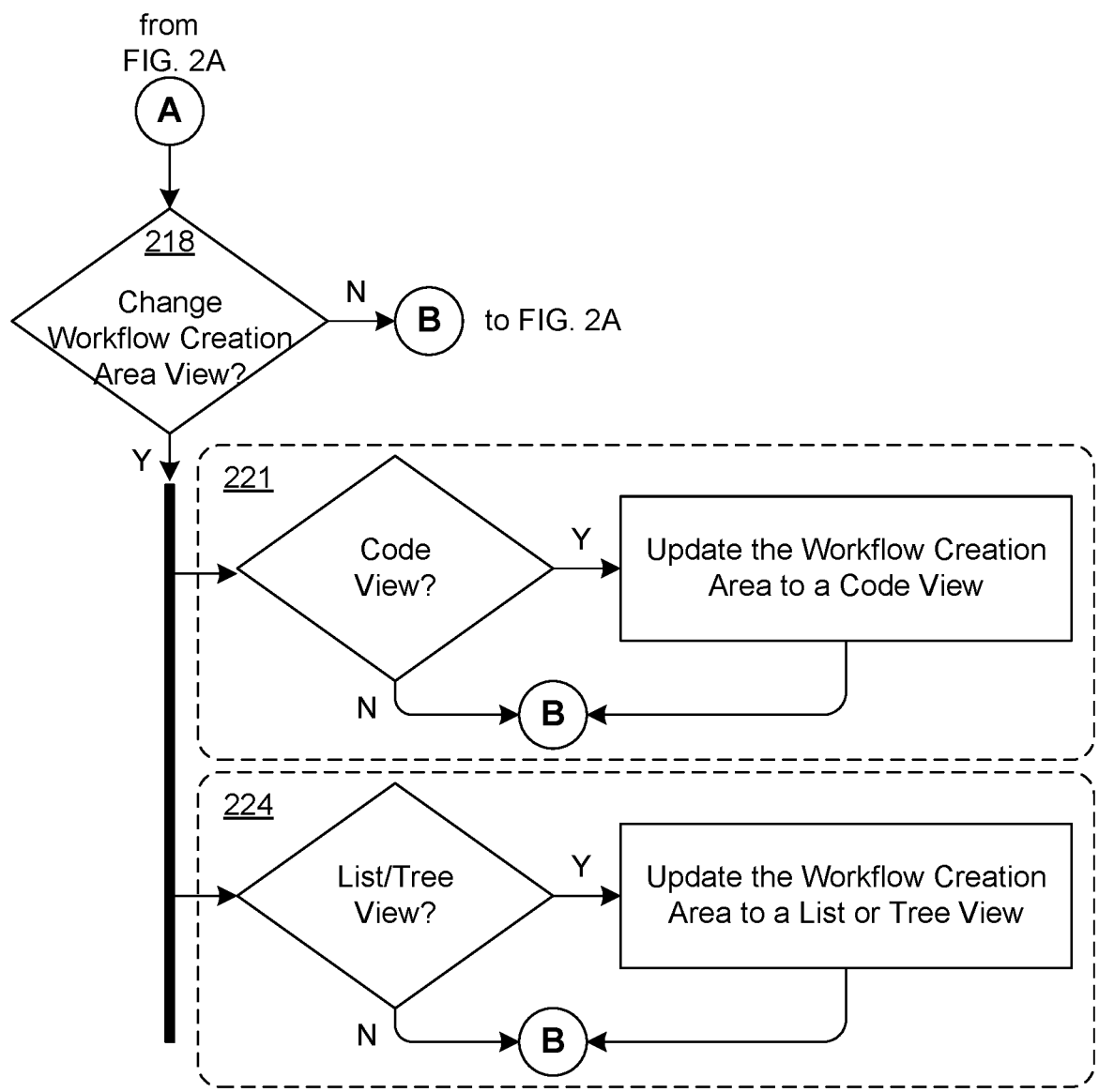
FIG. 2B illustrates another flowchart performed by components of the networked environment for device-driven management, according to various examples described herein.

FIG. 2B shows another flowchart performed by components of the networked environment 100. This flowchart continues from the flowchart of FIG. 2A, and further describes how the management console 121 provides user interface tools to efficiently and intuitively design device-driven management workflows 139.

In step 218, the management console 121 can determine whether to change the view or format of the workflow creation area. For example, the management console 121 can detect a user manipulation of an interface type selector. If the interface type selector is manipulated, then the process can move to step 221 or step 224. Otherwise, the process can move to step B, which connects to FIG. 2A.

In step 221, the management console 121 can determine whether a programming or code view has been selected by the user manipulation of the interface type selector. If the code view has been selected, then the management console 121 can update the workflow creation user interface area to include a code view. The code view can show the workflow objects 135 of the device-driven management workflow 139 reformatted as textually viewable and editable code or instructions. The process can then move to step B, which connects to FIG. 2A.

In step 224, the management console 121 can determine whether a list or tree view has been selected by the user manipulation of the interface type selector. If the tree view has been selected, then the management console 121 can update the workflow creation user interface area accordingly. A tree view can show the workflow objects 135 of the device-driven management workflow 139 reformatted into an expandable tree of hierarchical steps or list objects as discussed further with respect to FIG. 6. The process can then move to step B, which connects to FIG. 2A.

Figure 3:
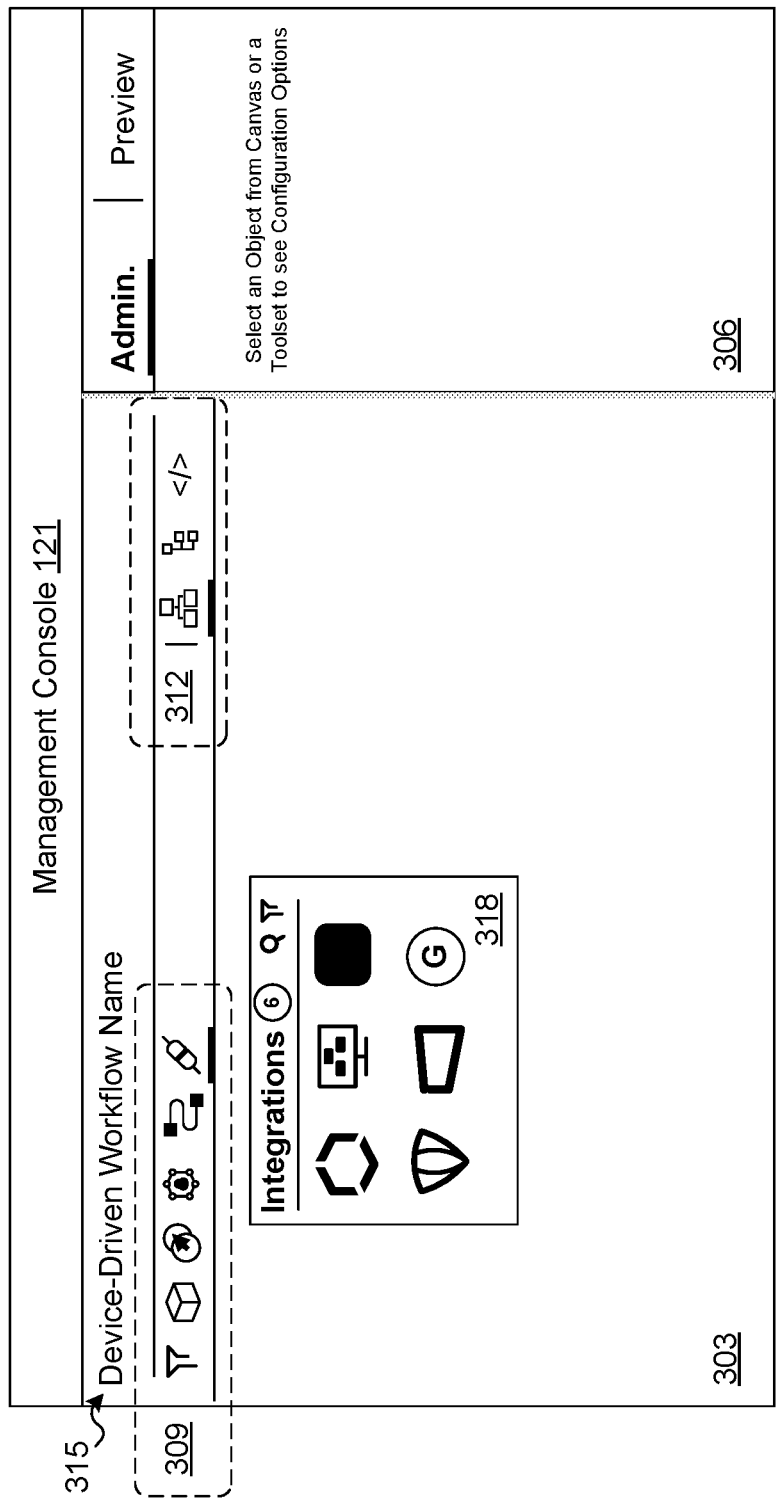
FIG. 3 illustrates an example user interface that provides tools for device-driven management using components of the networked environment, according to various examples described herein.

FIG. 3 shows an example user interface of the management console 121. The user interface can include tools for device-driven management. For example, the management console 121 can include a workflow creation area 303, as well as a side panel 306 for options and configuration. The workflow creation area 303 can include a toolset selector 309, an interface type selector 312, as well as a name or identifier 315 of a device-driven management workflow 139.

The workflow creation area 303 can include a drag-and-drop canvas user interface that shows the workflow objects 135 of a device-driven management workflow 139 in a graphical workflow view that includes icon-type or other graphical representations of workflow objects 135 connected to one another using line-type connector workflow objects 135. Using the interface type selector 312, a user can change the workflow creation area 303 to include a programming language user interface area that shows the workflow objects 135 of a device-driven management workflow 139 as text instructions or code; or a list or tree view that shows the workflow objects 135 of a device-driven management workflow 139 as a set of hierarchical list objects, where evaluation list objects are expandable to show textual representations for device-evaluated states 149. In some examples, the drag-and-drop canvas user interface can be in the workflow creation area 303, while the side panel 306 includes the programming language or the tree view of the device-driven management workflow 139.

The toolset selector 309 can include, from left to right, a filter icon, an inventory icon, a commands icon, a groups icon, a connector icon, a network service integrations icon, among others. A user selection of the filter icon can cause the management console 121 to show a toolset filtering element to filter the toolsets shown in the toolset selector 309.

A user selection of the inventory icon can cause the management console 121 to show an inventory toolset. The inventory toolset can include workflow objects 135 to install or apply corresponding to enterprise resources 129 such as databases, certificates, files, scripts, and applications 147.

A user selection of the commands icon can cause the management console 121 to show a commands toolset. The commands toolset can include workflow objects 135 corresponding to commands that can be performed by an operating system 143, an application 147, or other instructions executed on the client device 106. For example, commands can include a reboot command, a logout command, an enterprise wipe command that removes enterprise resources 129 from the client device 106, a command to generate a local notification, a command to transmit a message, a command to update data in a local or remote database, a command to perform an action using a network service 109 or the management service 120, a command to set a host name of the client device 106, a command to set a wallpaper of the client device 106, and other commands.

A user selection of the groups icon can cause the management console 121 to show a groups toolset. The groups toolset can include workflow objects 135 corresponding to user groups, device groups, and other logical groupings of client devices 106. The groups toolset can be used to modify workflow objects 135 in the device-driven management workflow 139. For example, a group workflow object 135 can modify a connector workflow object 135, such as an entry point, a line connector, or a condition based on the specified group.

A user selection of the connectors icon can cause the management console 121 to show a connectors toolset. The connectors toolset can include workflow objects 135 corresponding to connectors including entry points, line connectors, and conditions. Entry point workflow objects 135 can be used to start a device-driven management workflow 139. If the device-driven management workflow 139 is a complete standalone workflow, then the entry point can specify a specific client device 106, or a user group, a device group, or another logical grouping of client devices 106 for the device-driven management workflow 139. If the device-driven management workflow 139 is a smart resource workflow object 135

The toolset selector 309 can indicate that the network service integrations icon is selected. The network service integrations toolset 412 can show a number of icons corresponding to network service integrations 138 with network services 109. The network service integrations toolset 412 can provide an indicator of a number of network service integrations 138 that are currently set up. In the example shown, there are six (6) network service integrations 138 currently configured to import management workflows 153, device state definitions 155, and other first- and third-party management resources for a device-driven management workflow 139.

Selection of a particular network service integration from the network service integrations toolset 412 can update the network service integrations toolset 412 to show management workflows 153, device state definitions 155, and other management resources. Alternatively, selection of a particular network service integration from the network service integrations toolset 412 can update the side panel to show management workflows 153, device state definitions 155, and other management resources.

The network service integrations toolset 412 can also include a search functionality and a filter functionality. For example, a user can select a search icon to bring up a search element through which a user-entered textual search query can be entered. The management console 121 can update the network service integrations toolset 412 or the side panel 306 to show network service integrations 138, management workflows 153, device state definitions 155, and other management resources corresponding to the query.

A user can select a filter icon of the network service integrations toolset 412 to bring up a filtering element through which a set of categories can be user-selected. The management console 121 can update the network service integrations toolset 412 or the side panel 306 to show network service integrations 138, management workflows 153, device state definitions 155, and other management resources corresponding to the user-selected category.

Figure 4:
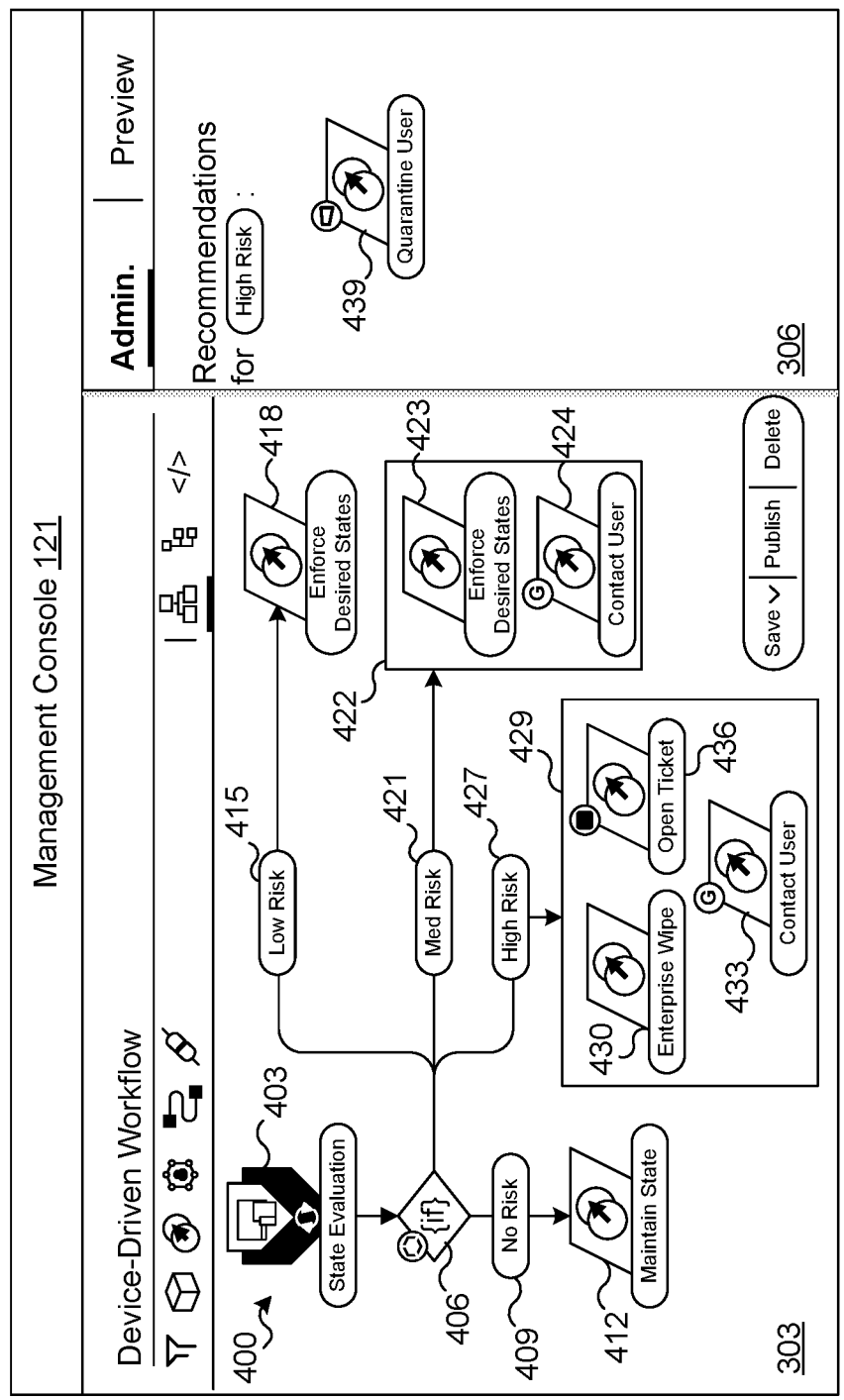
FIG. 4 illustrates another example user interface that provides tools for device-driven management using components of the networked environment, according to various examples described herein.

FIG. 4 shows an example user interface of the management console 121. The user interface can include tools for device-driven management. For example, the management console 121 can include a workflow creation area 303, a side panel 306, and other components as discussed.

The workflow creation area 303 can include a device-driven management workflow 400 that is created using workflow objects 135, which can include workflow objects 403 through 436. A nested entry point workflow object 403 can be connected to an if-evaluation workflow object 406 using a connector workflow object. The nested entry point workflow object 403 can indicate that the device-driven management workflow 139 is performed as a nested workflow that starts with an evaluation of one or more states 149. The nested entry point workflow object 403 can also indicate that the device-driven management workflow 400 is designed to be performed periodically on a client device 106 to evaluate the specified states 149 and execute an appropriate branch of instructions through the device-driven management workflow 400.

The if-evaluation workflow object 406 can include a network service badge that indicates that the if-evaluation workflow object 406 is performed using a network service 109. The network service badge can include an icon that identifies the network service 109. The network service 109 can include a first-party network service from a provider of the management service 120, or a third-party network service. The if-evaluation workflow object 406 can include a number of branches to execute based on the states 149 of the client device 106.

One branch of instructions from the if-evaluation workflow object 406 can include a connector workflow object 409 and a command workflow object 412. The connector workflow object 409 can include a "No Risk" device state indicator. The device state indicator provides an indication that a branch of instructions through the connector workflow object 409 is performed in conditions where states 149 of the client device 106 are associated with no risk. The risk level can be received and/or evaluated using the network service 109. In some cases, if the device state indicated by a connector workflow object 135 is associated with a network service 109, then a network service badge can be overlaid on the device state indicator or otherwise on the connector workflow object. The command workflow object 412 can include instructions for the management agent 145 to maintain states 149, or allow the current states 149.

A second branch of instructions from the if-evaluation workflow object 406 can include a connector workflow object 415 and a command workflow object 418. The connector workflow object 415 can include a "Low Risk" device state indicator. The device state indicator allows a user to quickly identify that the branch of instructions through the connector workflow object 415 is performed in conditions where states 149 of the client device 106 are associated with low risk, according to a risk level that is received and/or evaluated using a network service 109. The command workflow object 418 can include instructions for the management agent 145 to enforce desired states 149 on the client device 106. In other words, the management agent 145 can update a setting, configuration, or otherwise update states 149 on the client device 106.

A third branch of instructions from the if-evaluation workflow object 406 can include a connector workflow object 421 and an order-agnostic bounding box workflow object 422. The connector workflow object 421 can include a "Med Risk" device state indicator. The device state indicator allows a user to quickly identify that the branch of instructions through the connector workflow object 415 is performed in conditions where states 149 of the client device 106 are associated with medium risk, according to a risk level that is received and/or evaluated using a network service 109.

The order-agnostic bounding box workflow object 422 can include a command workflow object 423 and a command workflow object 424. The order-agnostic bounding box workflow object 422 indicates that the command workflow object 423 and the message workflow object 424 can be performed in any order with respect to one another including with partial or total concurrence, simultaneously, or otherwise. The command workflow object 423 can include instructions or commands for the management agent 145 to enforce desired states 149 on the client device 106. The command workflow object 424 can include instructions or commands for the management agent 145 to transmit a message, such as an email message, an SMS message, a messaging service message, or another type of message. The command workflow object 424 can include a network service badge with an identifier or icon associated with a network service 109 that is used to transmit the message.

A fourth branch of instructions from the if-evaluation workflow object 406 can include a connector workflow object 427 and an order-agnostic bounding box workflow object 429. The connector workflow object 427 can include a "High Risk" device state indicator. The device state indicator allows a user to quickly identify that the branch of instructions through the connector workflow object 415 is performed in conditions where states 149 of the client device 106 are associated with high risk, according to a risk level that is received and/or evaluated using a network service 109.

The order-agnostic bounding box workflow object 429 can include a command workflow object 430, a command workflow object 433, and a command workflow object 436. The order-agnostic bounding box workflow object 429 indicates that the command workflow object 430, the command workflow object 433, and the command workflow object 436 can be performed in any order. The command workflow object 430 can include instructions for the management agent 145 to perform an enterprise wipe that removes enterprise resources 129 and other enterprise data from the client device 106. The command workflow object 433 can include instructions for the management agent 145 to transmit a message, such as an email message, an SMS message, a messaging service message, or another type of message. The command workflow object 433 can include a network service badge with an identifier or icon associated with a network service 109 that is used to transmit the message. The command workflow object 436 can include a network service badge and instructions for the management agent 145 to open a ticket with a network service 109 specified by the network service badge. For example, a security ticket, an IT support ticket, and other types of tickets can be initiated using the specified network service 109.

The side panel 306 can include a set of recommendations for the high-risk state 149 indicated by the connector workflow object 427. The management console 121 can generate the recommendations based on a comprehensiveness definition 137. The management console 121 can analyze the workflow objects 135 that are in the workflow creation area 303 based on a comprehensiveness definition 137. The comprehensiveness definition 137 can identify a set of device states 149 or device conditions that the device-driven management workflows 139 can include in order to be considered comprehensive for the high-risk state 149.

The management console 121 can determine that the set of workflow object 135 downstream from the connector workflow object 427 lacks a quarantine user workflow object 439 specified in the comprehensiveness definition 137. The comprehensiveness definition 137 can specify that the quarantine user workflow object 439 is indicated for the high-risk state 149 specified by the connector workflow object 427. The management console 121 can then provide the quarantine user workflow object 439 as a recommendation.

A user can manipulate a cursor, touchscreen, or other input device to select the quarantine user workflow object 439. The user can click, click-and-drag, or otherwise select the quarantine user workflow object 439 to add it to the order-agnostic bounding box workflow object 429 or otherwise downstream from the connector workflow object 427 that specifies the high-risk state 149.

Figure 5A:
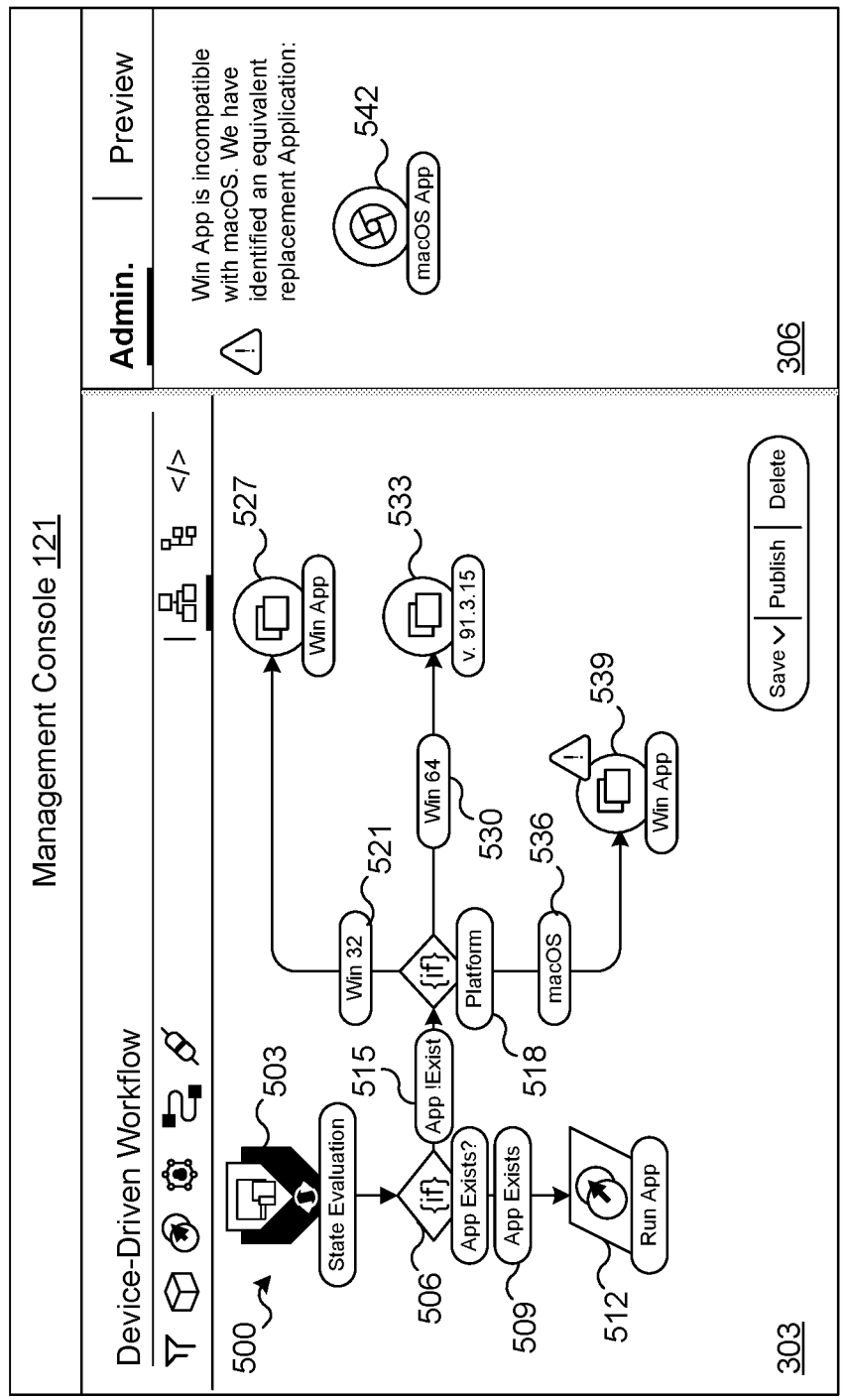
FIG. 5A illustrates another example user interface that provides tools for device-driven management using components of the networked environment, according to various examples described herein.

FIG. 5A shows an example user interface of the management console 121. The user interface can include tools for device-driven management. For example, the management console 121 can include a workflow creation area 303, a side panel 306, and other components as discussed.

The workflow creation area 303 can include a device-driven management workflow 500 that is created using workflow objects 135, which can include workflow objects 503 through 539. A nested entry point workflow object 503 can be connected to an if-evaluation workflow object 506 using a connector workflow object. The nested entry point workflow object 503 can indicate that the device-driven management workflow 139 is performed as a nested workflow that starts with an evaluation of one or more states 149. The nested entry point workflow object 503 can also indicate that the device-driven management workflow 500 is designed to be performed periodically on a client device 106 to evaluate the specified states 149 and execute an appropriate branch of instructions through the device-driven management workflow 500.

The if-evaluation workflow object 506 can include a number of branches to execute based on the states 149 of the client device 106. In some cases, the if-evaluation workflow object 506 can include an icon overlay that specifies a state 149 that is evaluated based on the if-evaluation workflow object 506. Here, the if-evaluation workflow object 506 can evaluate whether an application 147 exists on the client device 106 at the time of evaluation.

One branch of instructions from the if-evaluation workflow object 506 can include a connector workflow object 509 and a command workflow object 512. The connector workflow object 509 can include a "App Exists" evaluation status indicator. This evaluation status indicator indicates that the branch of instructions through the connector workflow object 509 is performed in conditions where the application 147 exists on the client device 106. The command workflow object 512 can include instructions for the management agent 145 to run the application 147.

A second branch of instructions from the if-evaluation workflow object 506 can include a connector workflow object 515 and another if-evaluation workflow object 518. The connector workflow object 515 can include a "App !Exist" evaluation status, indicating that the branch of instructions through the connector workflow object 515 is performed in conditions where the client device 106 lacks the application 147.

The if-evaluation workflow object 518 can specify a state 149 that is evaluated based on the if-evaluation workflow object 518. Here, the if-evaluation workflow object 518 can evaluate a platform or operating system 143 of the client device 106. The if-evaluation workflow object 518 can include a number of branches to execute based on the states 149 of the client device 106.

One branch of instructions from the if-evaluation workflow object 518 can include a connector workflow object 521 and an install application workflow object 527. The connector workflow object 512 can include a "Win 32" evaluation status indicator. This evaluation status indicator indicates that branch of instructions through the connector workflow object 409 is performed in conditions where the platform corresponds to an operating system 143 "Win 32." The install application workflow object 527 can include instructions for the management agent 145 to download and install the most recent "Win App" version of the application 147.

A second branch of instructions from the if-evaluation workflow object 518 can include a connector workflow object 530 and an install application workflow object 533. The connector workflow object 532 can include a "Win 64" evaluation status indicator. This evaluation status indicator indicates that branch of instructions through the connector workflow object 409 is performed in conditions where the platform corresponds to an operating system 143 version "Win 64." In this example, a user has specified a particular non-default version of the application 147. As a result, the management console 121 can paint the install application workflow object 533 to include a version identifier "v. 91.3.15" as an overlay on its graphical representation in the workflow creation area. The install application workflow object 533 can include instructions for the management agent 145 to download and install the "v. 91.3.15." version of the application 147.

A third branch of instructions from the if-evaluation workflow object 518 can include a connector workflow object 536 and an install application workflow object 539. The connector workflow object 536 can include a "macOS®" evaluation status indicator. This evaluation status indicator indicates that branch of instructions through the connector workflow object 409 is performed in conditions where the platform corresponds to a "macOS®" operating system 143.

The install application workflow object 539 can specify a "Win App" version of the application 147. The management console 121 can identify parent workflow objects 135 in the device-driven management workflow 139 upstream from the install application workflow object 539. The management console 121 can identify that the connector workflow object 536 specifies "macOS®" as a parent state 149 with respect to the install application workflow object 539. and can determine that the "Win App" specified by the install application workflow object 539 is incompatible with the "macOS®" parent state 149.

As a result, the management console 121 can paint the install application workflow object 539 to include warning or alert badge as an overlay on its graphical representation. The management console 121 can also update the side panel 306 to include a recommendation to correct the incompatibility. The management console 121 can identify that install application workflow object 539 is an "install application" workflow object type or category, and can identify that the install application workflow object 542 is a compatible workflow object 135 corresponding to the "install application" workflow object type. The management console 121 can update the side panel 306 to include the install application workflow object 542.

Figure 5B:
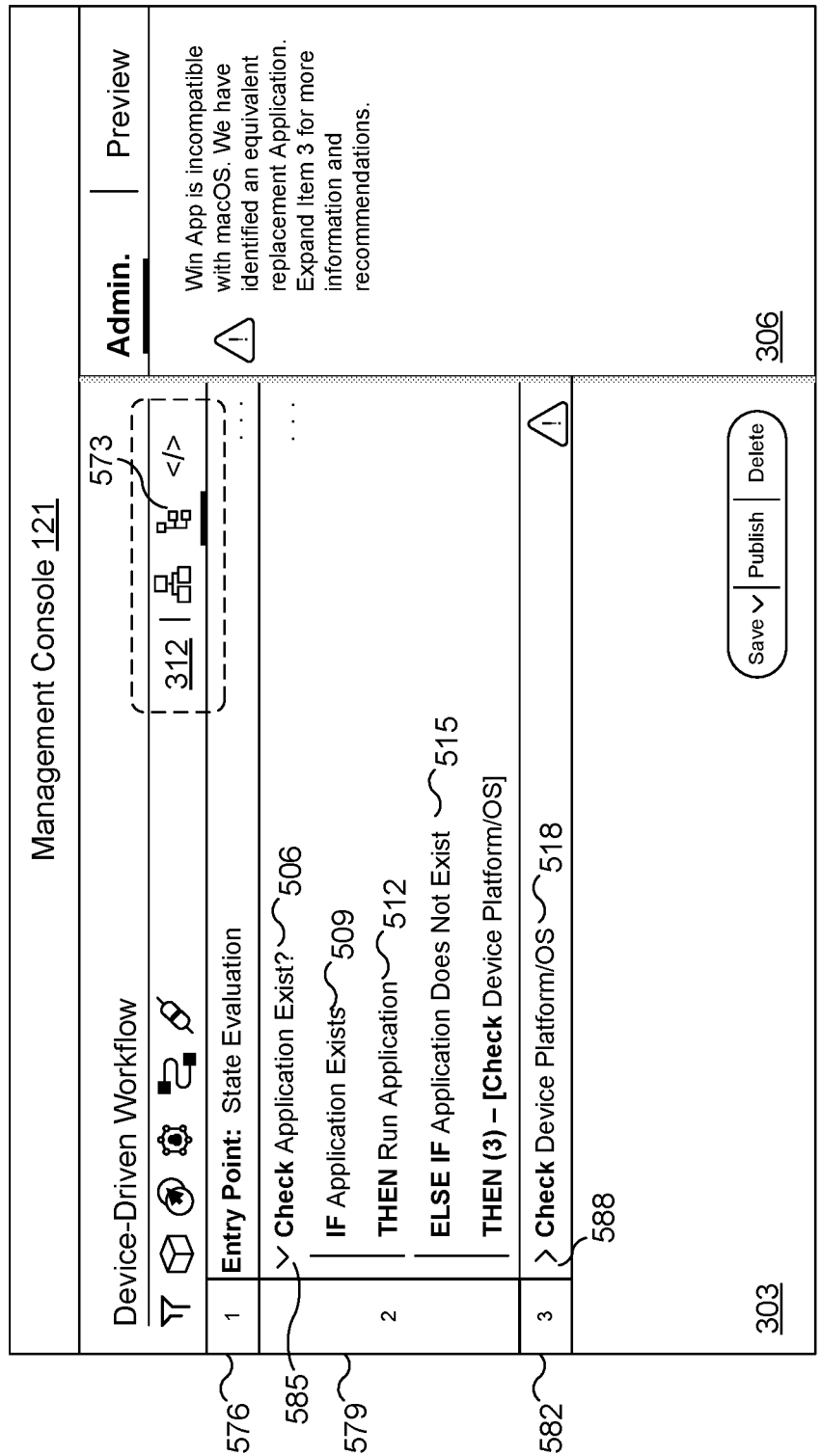
FIG. 5B illustrates another example user interface that provides tools for device-driven management using components of the networked environment, according to various examples described herein.

FIG. 5B shows another example user interface of the management console 121. The user interface can include tools for device-driven management. The management console 121 can include a workflow creation area 303, a side panel 306, and other components as discussed. Generally, FIG. 5B shows how a user can switch a view or format of the workflow creation area 303 of FIG. 5A to another view using the interface type selector 312.

The interface type selector 312 can include a tree view user interface element 573. If the tree view user interface element 573 is selected, then the management console 121 can update the workflow creation user interface area 303 to include a tree view. The tree view can show the workflow objects 503-539 of the device-driven management workflow 139 reformatted into a tree view.

List object 576 can include a reformatted version of the nested entry point workflow object 503. List object 579 can include reformatted versions of the workflow objects 506-515. Generally, a list object can include an evaluation workflow object 135 and all non-evaluation workflow objects 135 that stem from that evaluation workflow object 135, and a name or identification of any conditional objects that stem from the evaluation workflow object 135.

For example, the list object 579 can include the if-evaluation workflow object 506, the connector workflow object 509, the command workflow object 512, and the connector workflow object 515. The list object 579 can also specify a conditional or branching list object 582 that is referenced by the list object 579. The list object 579 can also include a user interface element 585 that contracts the list object 579 to show only the reformatted version of the if-evaluation workflow object 506, and to hide the non-evaluation workflow objects 509-515 that stem from the if-evaluation workflow object 506.

The list object 582 can include a reformatted version of the if-evaluation workflow object 518. The list object 582 can also include a user interface element 588 that expands the list object 579 to show the reformatted version of the if-evaluation workflow object 506, along with the non-evaluation workflow objects 521-539 that stem from the if-evaluation workflow object 518.

The flowchart(s) and sequence diagram(s) show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

The computing environment 103 can include at least one processing circuit. Such a processing circuit can include, for example, one or more processors and one or more storage or memory devices that are coupled to a local interface. The local interface can include, for example, a data bus with an accompanying address/control bus or any other suitable bus structure. Similarly, the client devices 106 can each include at least one processing circuit. Such a processing circuit can include, for example, one or more processors and one or more storage or memory devices that are coupled to a local interface.

The storage or memory devices can store data or components that are executable by the processors of the processing circuit. For example, the management service 120 and/or other components can be stored in one or more storage devices and be executable by one or more processors in the networked environment 100. Similarly, the agents, services, applications and/or other components described herein can be stored in one or more storage devices and be executable by one or more processors in the client device 106.

The management service 120 and/or other components described herein can be embodied in the form of hardware, software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 120 and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. While aspects of the disclosure can be described with respect to a specific figure, it is understood that the aspects are applicable and combinable with aspects described with respect to other figures. All such modifications and variations are intended to be included herein within the scope of this disclosure.

The invention claimed is:

1. A method, comprising:

generating, by a management service, a workflow creation user interface area and at least one toolset comprising a plurality of workflow objects;

identifying, by the management service, a device-driven management workflow comprising a subset of the plurality of workflow objects positioned in the workflow creation user interface area based on at least one user manipulation of the subset of the plurality of workflow objects, the subset of the plurality of workflow objects comprising an evaluation workflow object and a plurality of connector workflow objects that extend from the evaluation workflow object;

including, by the management service, a device state criteria overlay on a connector workflow object in an instance in which a device state criteria is specified for the connector workflow object, the connector workflow object comprising a line that extends between the evaluation workflow object and at least one workflow object corresponding to a branch of executable instructions performed in an instance in which a client device corresponds to a device state according to the specified device state criteria, and the device state criteria overlay shows a textual version of the device state;

including, in the workflow creation user interface area, an order-agnostic bounding box object that causes workflow objects positioned therein to be executed in an order-agnostic manner;

performing an analysis of a set of workflow objects downstream from the evaluation workflow object using a comprehensiveness definition for the device state, wherein the analysis identifies that the set of workflow objects lacks a recommended workflow object specified in the comprehensiveness definition for the device state;

generating a recommendation user interface that shows the textual version of the device state, and the recommended workflow object, wherein a user manipulation of the recommended workflow object adds the recommended workflow object downstream from the connector workflow object that specifies the device state criteria; and transmitting, by the management service to at least one client device, the device-driven management workflow.

2. The method of claim 1, wherein the device-driven management workflow comprises a branching sequence of instructions, and a respective client device performs a path through the branching sequence of instructions based on at least one client-device-evaluated state of the respective client device.

3. The method of claim 1, further comprising:
including, by the management service, a version number overlay on a resource installation workflow object in an instance in which a legacy version is specified for the resource installation workflow object, wherein the device state criteria overlay indicates that the legacy version does not correspond to a most-recent version of the resource.

4. The method of claim 1, further comprising:
including, by the management service, a network service badge overlay on a workflow object in an instance in which the workflow object specifies that a network service is utilized to perform the workflow object, wherein the network service badge comprises an icon that identifies the network service.

5. The method of claim 1, further comprising:
identifying, by the management service, a conflicting workflow object that conflicts with at least one prerequisite state specified by at least one upstream workflow object that is upstream from the workflow object in the device-driven management workflow, wherein the conflicting workflow object corresponds to a particular workflow object type.

6. The method of claim 5, further comprising:
automatically replacing, by the management service, the conflicting workflow object with a non-conflicting workflow object that corresponds to the particular workflow object type, wherein the non-conflicting workflow object is compatible with the at least one prerequisite state specified by the at least one upstream workflow object.

7. The method of claim 5, further comprising:
generating, by the management service, a user interface area comprising a recommendation to replace the conflicting workflow object with a non-conflicting workflow object that corresponds to the particular workflow object type, wherein the non-conflicting workflow object is compatible with the at least one prerequisite state specified by the at least one upstream workflow object.

8. A non-transitory computer-readable medium embodying instructions executable by at least one computing device, the instructions, when executed, causing the at least one computing device to at least:
generate, by a management service, a workflow creation user interface area and at least one toolset comprising a plurality of workflow objects;

identify, by the management service, a device-driven management workflow comprising a subset of the plurality of workflow objects positioned in the workflow creation user interface area based on at least one user manipulation of the subset of the plurality of workflow objects, the subset of the plurality of workflow objects comprising an evaluation workflow object and a plurality of connector workflow objects that extend from the evaluation workflow object;

include, by the management service, a device state criteria overlay on a connector workflow object in an instance in which a device state criteria is specified for the connector workflow object, the connector workflow object comprising a line that extends between the evaluation workflow object and at least one workflow object corresponding to a branch of executable instructions performed in an instance in which a client device corresponds to a device state according to the specified device state criteria, and the device state criteria overlay shows a textual version of the device state; include, in the workflow creation user interface area, an order-agnostic bounding box object that indicates that workflow objects positioned therein are to be executed in an order-agnostic manner;

perform an analysis of a set of workflow objects downstream from the evaluation workflow object using a comprehensiveness definition for the device state, wherein the analysis identifies that the set of workflow objects lacks a recommended workflow object;

generate a recommendation user interface comprising: the textual version of the device state, and a recommended workflow object, wherein a user manipulation of the recommended workflow object adds the recommended workflow object downstream from the connector workflow object that specifies the device state criteria; and transmit, by the management service to at least one client device, the device-driven management workflow.

9. The non-transitory computer-readable medium of claim 8, wherein a respective client device performs a corresponding path through a branching sequence of instructions of the device-driven management workflow based on at least one client-device-evaluated state of the respective client device.

10. The non-transitory computer-readable medium of claim 8, wherein the instructions, when executed, cause the at least one computing device to at least:
include, by the management service, a version number overlay on a resource installation workflow object in an instance in which a legacy version is specified for the resource installation workflow object, wherein the device state criteria overlay indicates that the legacy version does not correspond to a most-recent version of the resource.

11. The non-transitory computer-readable medium of claim 8, wherein the instructions, when executed, cause the at least one computing device to at least:
include, by the management service, a network service badge overlay on a workflow object in an instance in which the workflow object specifies that a network service is utilized to perform the workflow object, wherein the network service badge comprises an icon that identifies the network service.

12. The non-transitory computer-readable medium of claim 8, wherein the instructions, when executed, cause the at least one computing device to at least:
identify, by the management service, a conflicting workflow object that conflicts with at least one prerequisite state specified by at least one upstream workflow object that is upstream from the workflow object in the device-driven management workflow, wherein the conflicting workflow object corresponds to a particular workflow object type.

13. The non-transitory computer-readable medium of claim 12, wherein the instructions, when executed, cause the at least one computing device to at least:
automatically replace, by the management service, the conflicting workflow object with a non-conflicting workflow object that corresponds to the particular workflow object type, wherein the non-conflicting workflow object is compatible with the at least one prerequisite state specified by the at least one upstream workflow object.

14. The non-transitory computer-readable medium of claim 12, wherein the instructions, when executed, cause the at least one computing device to at least:
generate, by the management service, a user interface area comprising a recommendation to replace the conflicting workflow object with a non-conflicting workflow object that corresponds to the particular workflow object type, wherein the non-conflicting workflow object is compatible with the at least one prerequisite state specified by the at least one upstream workflow object.

15. A system, comprising:
at least one computing device; and
instructions accessible by the at least one computing device, wherein the instructions are executed causing the at least one computing device to at least:
generate, by a management service, a workflow creation user interface area and at least one toolset comprising a plurality of workflow objects;
identify, by the management service, a device-driven management workflow comprising a subset of the plurality of workflow objects positioned in the workflow creation user interface area based on at least one user manipulation of the subset of the plurality of workflow objects, the subset of the plurality of workflow objects comprising an evaluation workflow object and a plurality of connector workflow objects that extend from the evaluation workflow object;
include, by the management service, a device state criteria overlay on a connector workflow object in an instance in which a device state criteria is specified for the connector workflow object, the connector workflow object comprising a line that extends between the evaluation workflow object and at least one workflow object corresponding to a branch of executable instructions performed in an instance in which a client device corresponds to a device state according to the specified device state criteria, and the device state criteria overlay shows a textual version of the device state;
perform an analysis of a set of workflow objects downstream from the evaluation workflow object using a comprehensiveness definition for the device state, wherein the analysis identifies that the set of workflow objects lacks a recommended workflow object;
generate a recommendation user interface comprising: the textual version of the device state, and a recommended workflow object specified in the comprehensiveness definition for the device state, wherein a user manipulation of the recommended workflow object adds the recommended workflow object downstream from the connector workflow object that specifies the device state criteria; and
transmit, by the management service to at least one client device, the device-driven management workflow.

16. The system of claim 15, wherein a respective client device performs a corresponding path through a branching sequence of instructions of the device-driven management workflow based on at least one client-device-evaluated state of the respective client device.

17. The system of claim 15, wherein the instructions, when executed, cause the at least one computing device to at least:
include, by the management service, a version number overlay on a resource installation workflow object in an instance in which a legacy version is specified for the resource installation workflow object, wherein the device state criteria overlay indicates that the legacy version does not correspond to a most-recent version of the resource.

18. The system of claim 15, wherein the instructions, when executed, cause the at least one computing device to at least:
include, by the management service, a network service badge overlay on a workflow object in an instance in which the workflow object specifies that a network service is utilized to perform the workflow object, wherein the network service badge comprises an icon that identifies the network service.

19. The system of claim 15, wherein the instructions, when executed, cause the at least one computing device to at least:
identify, by the management service, a conflicting workflow object that conflicts with at least one prerequisite state specified by at least one upstream workflow object that is upstream from the workflow object in the device-driven management workflow, wherein the conflicting workflow object corresponds to a particular workflow object type.

20. The system of claim 19, wherein the instructions, when executed, cause the at least one computing device to at least:
automatically replace, by the management service, the conflicting workflow object with a non-conflicting workflow object that corresponds to the particular workflow object type, wherein the non-conflicting workflow object is compatible with the at least one prerequisite state specified by the at least one upstream workflow object.

\* \* \* \* \*